US011345565B2

(12) United States Patent
Smith et al.

(10) Patent No.: US 11,345,565 B2
(45) Date of Patent: May 31, 2022

(54) FOLDING CAROUSEL FOR UMBILICALS

(71) Applicant: Koil Energy Solutions, Inc., Houston, TX (US)

(72) Inventors: Ronald E. Smith, Huffman, TX (US); Neil Stuckey, Houston, TX (US); Troy Moran, Houston, TX (US); Jacob Hargrave, Houston, TX (US); Chris Sebesta, Houston, TX (US); Michael Fields, Houston, TX (US); Dustin Goitia, Houston, TX (US)

(73) Assignee: Koil Energy Solutions, Inc., Houston, TX (US)

( * ) Notice: Subject to any disclaimer, the term of this patent is extended or adjusted under 35 U.S.C. 154(b) by 209 days.

(21) Appl. No.: 16/551,264

(22) Filed: Aug. 26, 2019

(65) Prior Publication Data

US 2021/0009379 A1    Jan. 14, 2021

Related U.S. Application Data

(60) Provisional application No. 62/872,821, filed on Jul. 11, 2019.

(51) Int. Cl.
*B65H 49/28* (2006.01)
*B65H 75/44* (2006.01)

(52) U.S. Cl.
CPC ..... *B65H 75/4465* (2013.01); *B65H 75/4481* (2013.01)

(58) Field of Classification Search
CPC ............ B65H 75/4465; B65H 75/4481; B65H 49/28; B65H 49/321; F16L 1/203
See application file for complete search history.

(56) References Cited

U.S. PATENT DOCUMENTS

| 2,463,192 | A | * | 3/1949 | Johansen | B65H 75/22 242/407.1 |
|---|---|---|---|---|---|
| 3,559,905 | A | | 2/1971 | Palynchuk | |
| 3,941,146 | A | * | 3/1976 | Chatard | E21B 19/22 137/355.16 |
| 6,260,791 | B1 | | 7/2001 | Seguin | |
| 8,487,180 | B1 | | 7/2013 | Fraas et al. | |
| 2013/0216315 | A1 | | 8/2013 | Pionetti et al. | |
| 2017/0292337 | A1 | | 10/2017 | White et al. | |
| 2018/0290856 | A1 | * | 10/2018 | Buller | B62B 1/10 |

OTHER PUBLICATIONS

Extended European Search Report issued in European Application No. 20185554.1, dated Nov. 16, 2020 (7 pages).

* cited by examiner

*Primary Examiner* — Sang K Kim
(74) *Attorney, Agent, or Firm* — Osha Bergman Watanabe & Burton LLP

(57) ABSTRACT

A carousel for pipe products including cables and umbilicals includes a drum coupled to a carousel adapter, the carousel adapter coupled to a drive unit. The carousel adapter includes an upper base plate opposite a lower base plate, a fixed base leg coupled between the upper base plate and the lower base plate and extending radially outwardly therefrom. The carousel adapter also includes a plurality of foldable base legs coupled between the upper base plate and the lower base plate and extending radially outwardly from the upper and lower base plates. Each of the foldable base legs is disposed about a periphery of the upper and lower base plates and is rotatable about an independent axis perpendicular to the upper base plate and the lower base plate.

7 Claims, 6 Drawing Sheets

FOLDING CAROUSEL FOR UMBILICALS

CROSS-REFERENCE TO RELATED APPLICATIONS

This application claims priority to U.S. Provisional Application No. 62/872,821, filed on Jul. 11, 2019, the contents of which are hereby incorporated by reference in its entirety.

BACKGROUND

Subsea umbilicals are multi-part cables used in the oil and gas industry to connect a host to a subsea production facility. The host may be a floating production storage and offloading vessel, (FPSO) a floating rig, or a shore based facility. The host is manned, and the subsea production facility is unmanned. The subsea umbilical may include a) tubing for various fluids including hydraulic fluid, and/or chemicals such as methanol; b) electrical power cables; c) fiber optic cables; d) wire rope; e) fillers; f) reinforcements and/or combinations thereof. Some of the subsea oil production facilities are in thousands of feet of water and therefore the conventional subsea umbilicals may be several thousand feet long. The umbilical hangs off an I-tube or a J-tube on the host and connects to the topside umbilical termination assembly (TUTA); subsea, the umbilical often connects to an umbilical termination assembly, referred to in the industry as a UTA.

Carousels and spoolers are structures used store and install rigid and flexible pipe products, including cables and umbilicals. Carousels may be used for land-based storage, transportation, or offshore deployment of pipe products from an installation vessel. Carousels may be coupled to drive systems to rotate a drum of the carousel to spool or unspool the product.

SUMMARY

An apparatus includes a carousel adapter, the carousel adapter having an upper base plate opposite a lower base plate, a fixed base leg coupled between the upper base plate and the lower base plate and extending radially outwardly therefrom, and a plurality of foldable base legs coupled between the upper base plate and the lower base plate and extending radially outwardly from the upper and lower base plates, each of the foldable base legs disposed about a periphery of the upper and lower base plates and rotatable about an independent axis perpendicular to the upper base plate and the lower base plate, and a drive unit coupled to the carousel adapter.

A method includes fixedly securing a fixed base leg between an upper base plate and a lower base plate, rotatably securing a plurality of foldable base legs between the upper base plate and the lower base plate around the periphery of the upper and lower base plates, and coupling the lower base plate to a drive unit.

DETAILED DESCRIPTION

Figure 1:
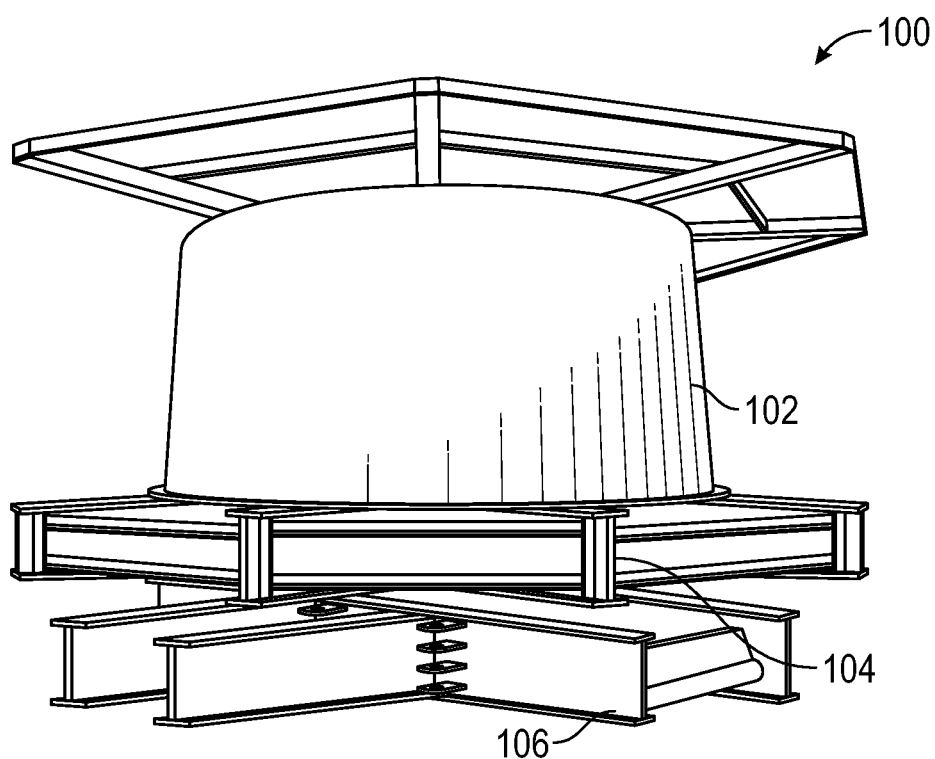
FIG. 1 is a perspective view of a carousel assembly in accordance with embodiments disclosed herein.

In the following detailed description, reference is made to the accompanying drawings. In the drawings, similar symbols or identifiers typically identify similar components, unless context dictates otherwise. The illustrative embodiments described herein are not meant to be limiting. Other embodiments may be used, and other changes may be made, without departing from the scope of the subject matter presented here. It will be readily understood that aspects of the present disclosure, as generally described herein, and illustrated in the Figures, may be arranged, substituted, combined, and designed in a wide variety of different configurations, all of which are explicitly contemplated and make part of this disclosure.

Embodiments disclosed herein generally relate to a system, device, apparatus, and/or method for holding, storing, transporting, spooling and/or unspooling rigid and flexible pipe products, including cables and umbilicals. More specifically, embodiments disclosed herein relate to a carousel adapter for coupling between a drum of a carousel and a drive unit used for rotating the drum of the carousel to spool or unspool the pipe product. As will be discussed in more detail below, the carousel adapter is foldable or collapsible to reduce the overall size of the carousel adapter for transportation. In certain embodiments, the drive unit also includes foldable or collapsible components that allow for the carousel adapter and the drive unit to be transported together with a reduced overall size as compared to the size of the drive unit and carousel in the operational configuration.

Rigid and flexible pipe products, including cables and umbilicals, are manufactured and/or assembled in long segments onshore for use in offshore applications. As such, these pipe products are wound around drums of a carousel onshore for storage and transportation to an offshore vessel. Additional components of the carousel, including the carousel base or adapter and the drive unit must also be transported to the offshore vessel and are generally larger in diameter than the drum in order to support the load of the drum and pipe product. Transportation of such large components is often difficult and slow and may require special permitting to travel on certain roadways or between countries to reach a port for installation on a sea vessel. The time it takes to obtain such permitting may be lengthy and therefore may cause delays and/or increase projects costs.

Embodiments of the present disclosure provide a system that may allow for more compact components for transportation of the carousel system to the offshore vessel. Once the carousel system is positioned on the vessel, the carousel system may be opened or expanded into full operation position and assembled.

Figure 2:
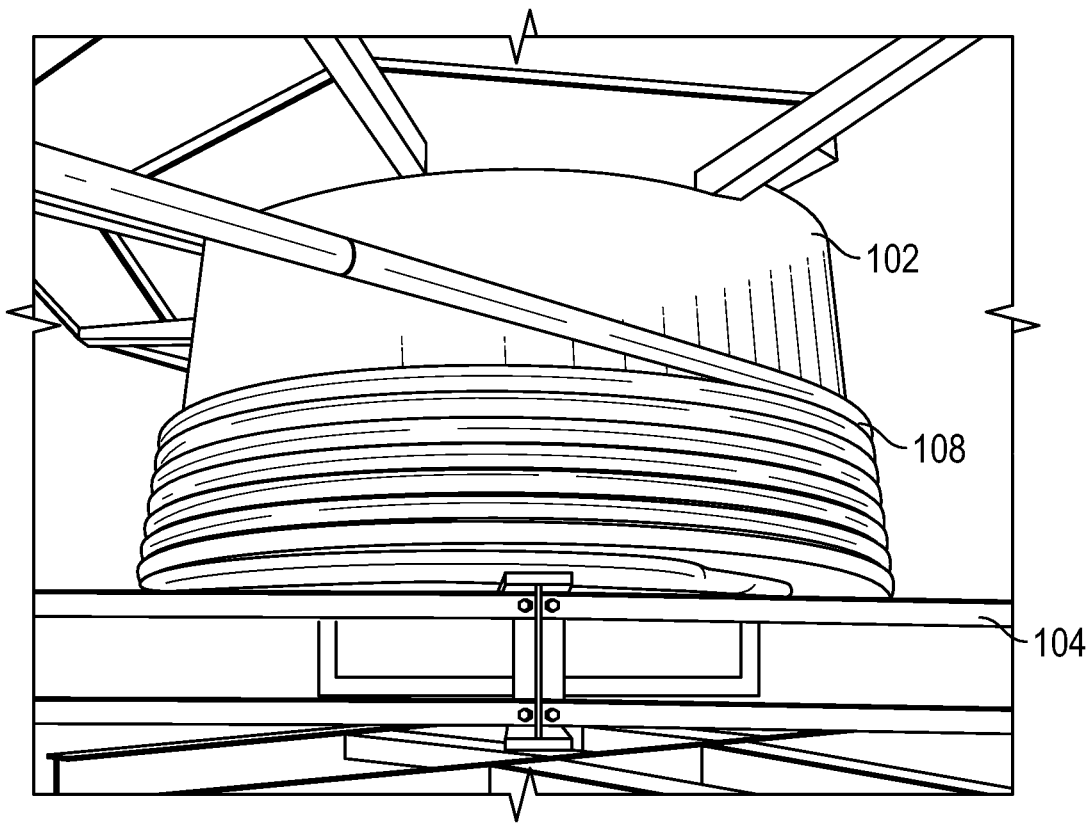
FIG. 2 is a perspective view of a carousel assembly with an umbilical in accordance with embodiments disclosed herein.

FIG. 1 shows a carousel system 100 having a drum 102, a carousel adapter 104, and a drive unit 106. FIG. 2 shows the carousel system 100 with pipe product 108, such as an umbilical, wound around the drum 102. As shown the drum 102 is a cylindrical body coupled to an upper surface of the carousel adapter 104. The drive unit 106 is positioned below the carousel adapter 104 and drives (rotates) the drum 102 with a motor (not shown), gear (not shown), and drive chain (not shown) to spool or unspool the pipe product 108.

Figure 3:
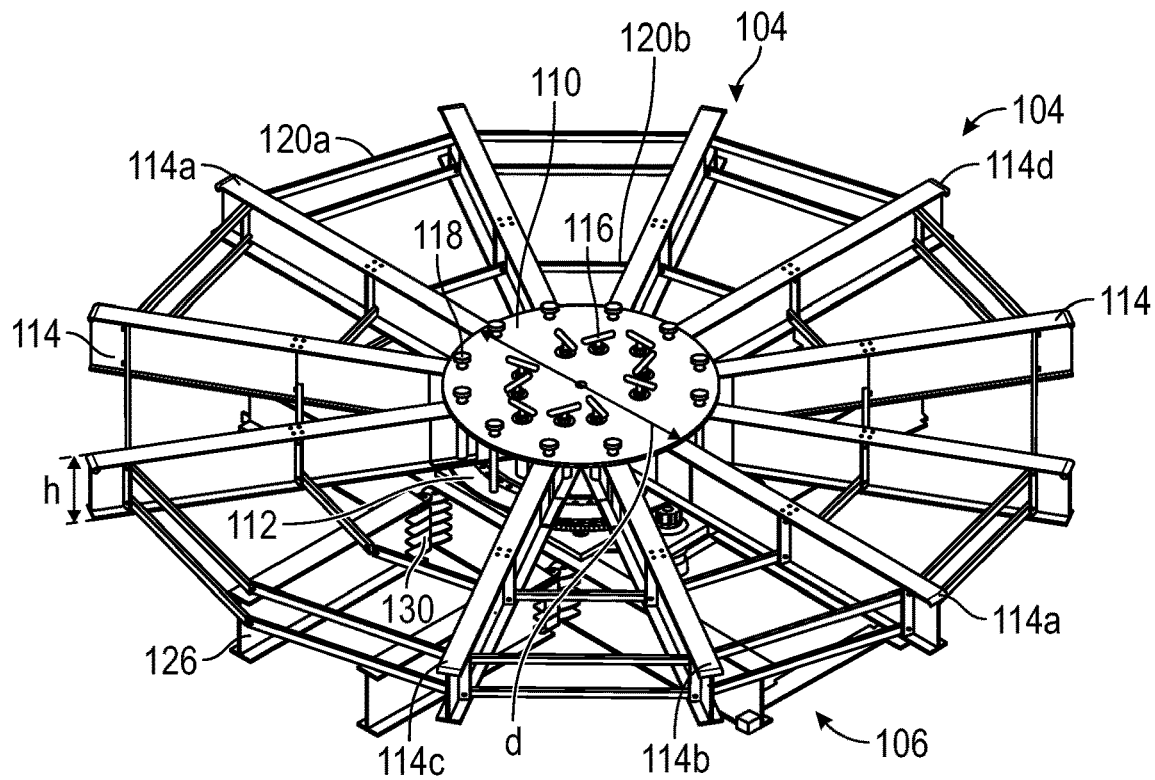
FIG. 3 is a perspective view of a carousel adapter and drive unit in an operational configuration in accordance with embodiments disclosed herein.
Figure 4:
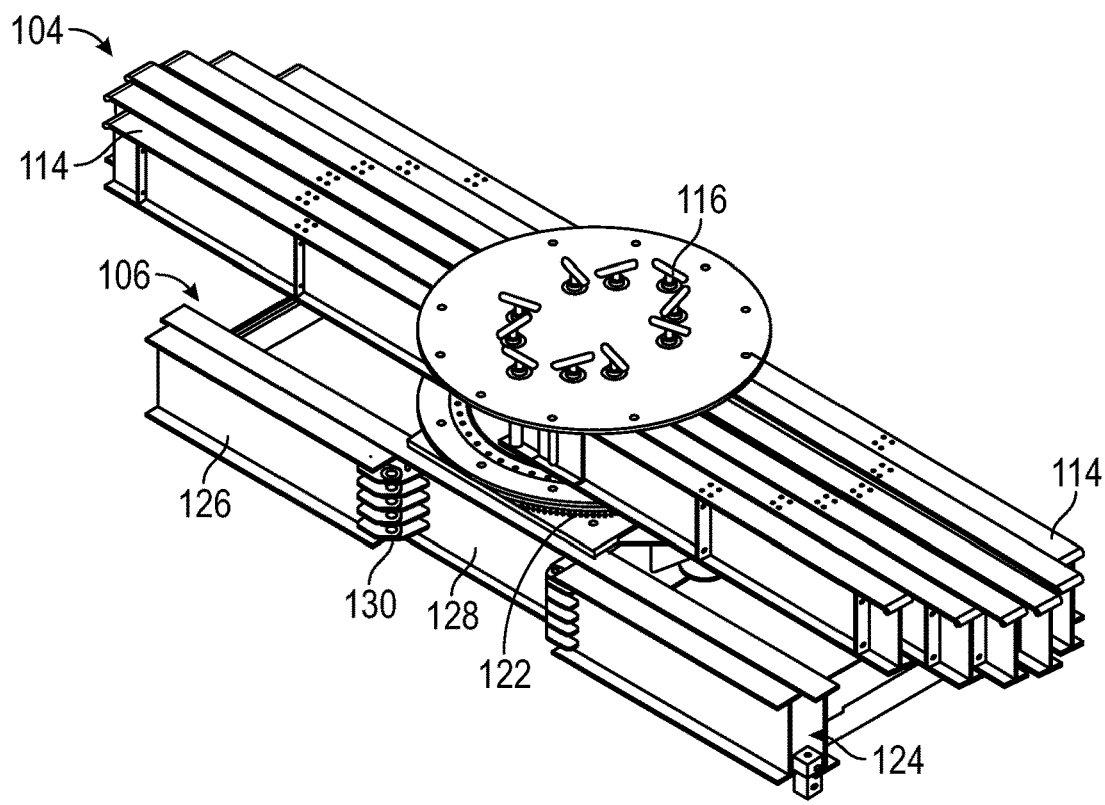
FIG. 4 is a perspective view of the carousel adapter and drive unit of FIG. 3 in folded or collapsed configuration.

Referring now to FIGS. 3 and 4, the carousel adapter 104 and drive unit 106 are shown in the operational configuration and the shipping (collapsed) configuration, respectfully. As can be seen, the drum 102 (FIGS. 1 and 2) is removed from the carousel adapter 104 for transportation. The carousel adapter 104 includes an upper base plate 110 spaced apart from a lower base plate 112 by a distance equal to or greater than a height h of a plurality of base legs 114. As shown, the upper and lower base plates, 110, 112 may be circular plates having a diameter d. The diameter d of the upper and lower base plates, 110, 112 is less than the diameter of the assembled base legs 114. One of ordinary skill in the art will appreciate that the diameter of the base plates 110, 112 may vary depending on the specific application of the carousel, the load carried, the materials used, etc. In some embodiments, the diameters of the base plates 110, 112 may be one fifth, one quarter, one third, or one half of the diameter defined by the assembled based legs 114. The upper and lower base plates 110, 112 may have a different diameters from either other. Furthermore, the base plates 110, 112 may not be circular plates, but rather may be square, rectangular, triangular, etc.

The carousel adapter 104 may include a base leg 114a that is welded to the upper and lower base plates 110, 112. The base leg 114a welded to the upper and lower base plates, 110, 112 may be positioned such that the welded base leg 114a aligns with the diameters of the upper and lower base plates, 110, 112. The welded (or fixed) base leg 114a is positioned such that the extension length of the welded base leg 114a on one side of the base plates is equal to the extension length of the welded base leg 114 on the opposite side of the base plates. In other embodiments, the carousel adapter 104 may include two base legs 114a such that the two welded base legs 114a may be positioned directly across from each other such that the two welded base legs 114a align with a diameter of the upper and lower base plates, 110, 112. In still other embodiments, additional base legs 114 may be welded to the upper and lower base plates 110, 112.

The remaining base legs 114 are coupled to the upper and lower base plates, 110, 112 such that the remaining base legs 114 may be rotated about an axis to fold or collapse the legs inwards toward the welded base leg(s) 114a. The number of base legs 114 may vary based on the application of a give carousel adapter, the load carried, the material used, and various other factors and design parameters. While FIGS. 3 and 4 show 9 foldable base legs 114, a tenth foldable leg 114 may also be added opposite foldable base leg 114d. Further, one of ordinary skill in the art will appreciate that there may be 2, 3, 4, or more foldable base legs 114. 5 Further, the dimensions of each base leg 114 may also vary. For example, in one embodiment, the base leg 114 positioned along the outer diameter of the base plates further away from the welded base leg 114a may be shorter in length than the base legs 114 positioned closer to the welded base leg 114a. For example, with reference to FIG. 3, in one embodiment, welded base leg 114a is approximately 28 feet long, foldable base leg 114b is 12 feet, 8 inches long, foldable base leg 114c is 12 feet, 6 inches long, and base foldable leg 114d is 12 feet long. These dimensions are provided as an example only and are not limiting. One of ordinary skill in the art will appreciate that the lengths, widths, heights and cross-sections of the base legs 114 may vary as discussed above. As shown, the plurality of base legs 114 may be I-beams positioned vertically. However, in other embodiments, beams of different cross-sectional shapes may be used.

Still referring to FIGS. 3 and 4, a plurality of swivel pins 116 may be used to couple each of the foldable base legs 114 to the upper and lower base plates, 110, 112. The swivel pin allows each foldable base leg 114 to rotate about an axis perpendicular to the upper and lower surfaces of the upper and lower base plates, 110, 112. As shown, the swivel pins 116 are arranged in a circular or elliptical pattern towards an interior portion of the upper and lower base plates, 110, 112. The swivel pin 116 extends through the upper base plate 110, through a foldable base leg 114 and into the lower base plate 112, thereby rotatably securing the foldable base leg 114 between the upper and lower base plates, 110, 112.

A plurality of lock pins 118 are disposed around a periphery of the upper and lower base plates, 110, 112. Each lock pin secures a foldable base leg 114 in an open position in the operational configuration shown in FIG. 3. During transport, the base legs 114 of the carousel adapter 104 are rotated to a folded or collapsed position as shown in FIG. 4, wherein the foldable base legs 114 are rotated about the swivel pins 116 toward the welded base leg 114a. In this position, the overall size (diameter or width) of the carousel adapter may be reduced so that it can fit on a truck without being oversized for highway transport.

Once the carousel adapter is installed on a vessel, the foldable base legs 114 may be opened and locked into operational positions with the lock pins 118. Additional supports 120 may be added between the foldable base legs 114 after the base legs 114 have been opened and secured by the lock pins 118. As shown, the supports 120a installed between the base legs 114 at a distance further from the center of the carousel adapter 104 may be longer than the supports 120 installed closer to the center of the carousel adapter 104. These supports may be coupled between the base legs 114 by any means known in the art, for example, by bolts, such as hex bolts.

The carousel adapter 104 is coupled to the drive unit 106. As shown in FIG. 4, the drive unit 106 includes a motor (not shown), gear 122, and drive chain (not shown). The drive unit 106 includes a drive base 124 to support the elements of the driver unit 106. The drive base 124 includes a base frame 128 and a plurality of stabilizing arms 126 coupled to the base frame 128. The base frame 128 and stabilizing arms 126 may be I-beams positioned vertically. The base frame 128 may include two longitudinal beams and one or more cross beams. One or more of the stabilizing arms 128 may be coupled to the base frame 128 with a hinge 130. The hinge 130 allows a stabilizing arm 128 to be rotated to fold or collapse the stabilizing arm 128 against the base frame 128.

During transportation, the drive base 124 may be aligned with the welded or fixed base leg 114a such that a longer dimension of the drive base 124 is parallel to a length of the fixed base leg 114 of the carousel adapter. The stabilizing arms 128 of the drive base 124 may be rotated about hinge 130 to fold or collapse the stabilizing arm 126 against the base frame 128 to reduce the overall diameter or width of the drive base 124.

Figure 5:
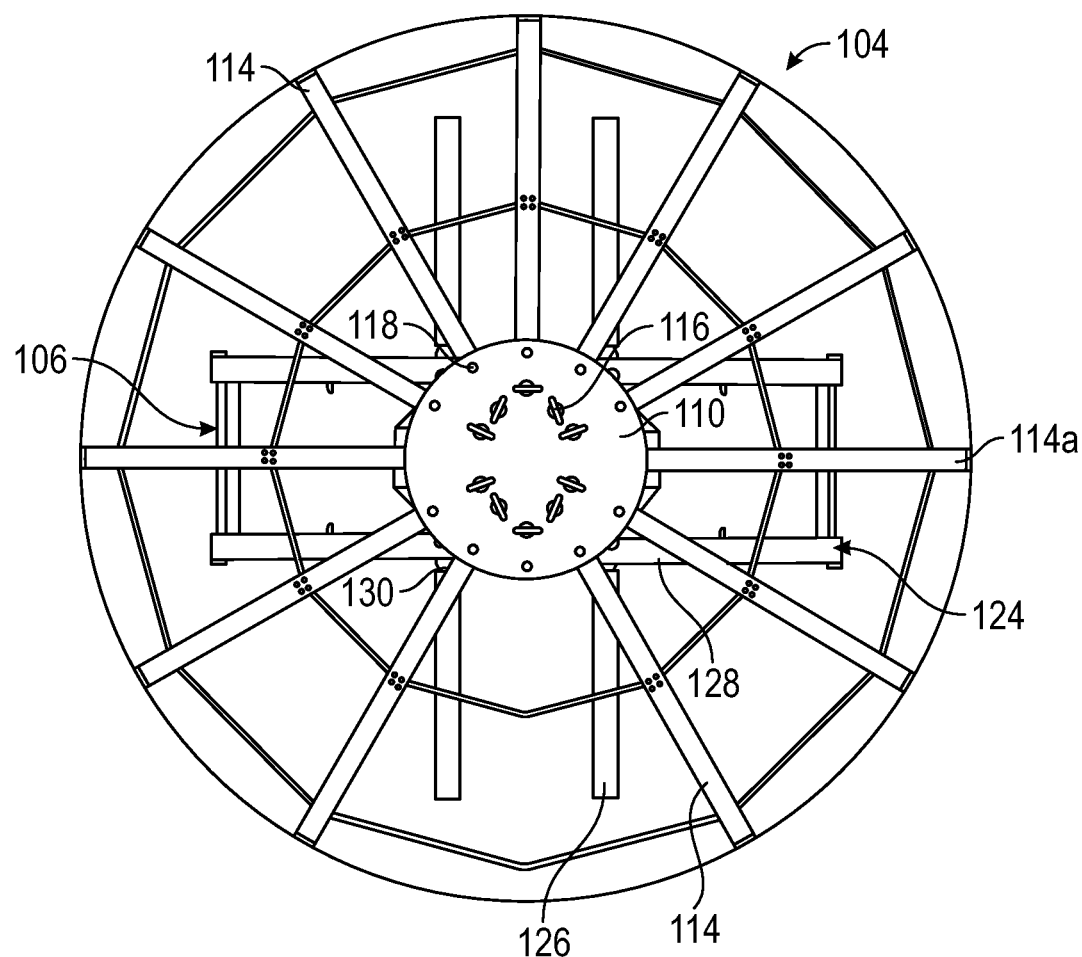
FIG. 5 is a top view of the FIG. 3.

FIG. 5 shows a top view of the carousel adapter 104 coupled to the drive unit 106 in the operational configuration. As shown, the stabilizing arms 126 are rotated about hinges 130 and opened to stabilize the drive unit 106. The carousel adapter 104 is installed on the drive unit 106 and the foldable base legs 114 are opened about swivel pins 118 and secured in the open positions via lock pins 118.

Figure 6:
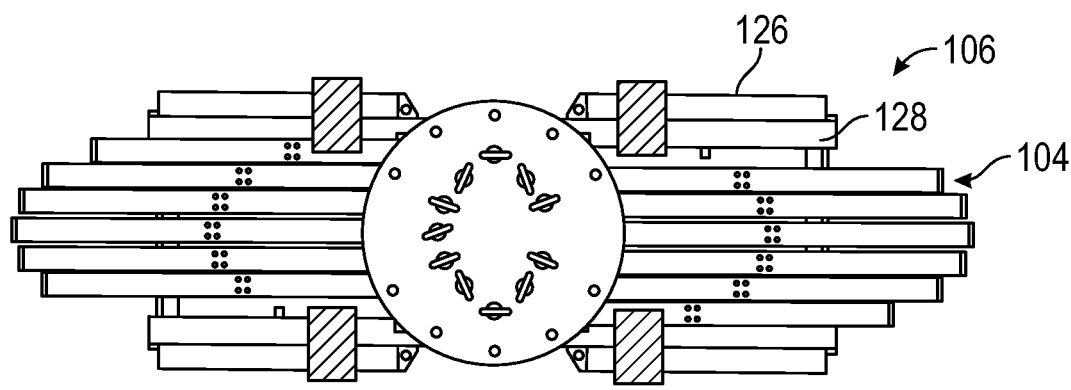
FIG. 6 is a top view of a carousel adapter and a drive unit in a collapsed configuration in accordance with embodiments disclosed herein.
Figure 7:
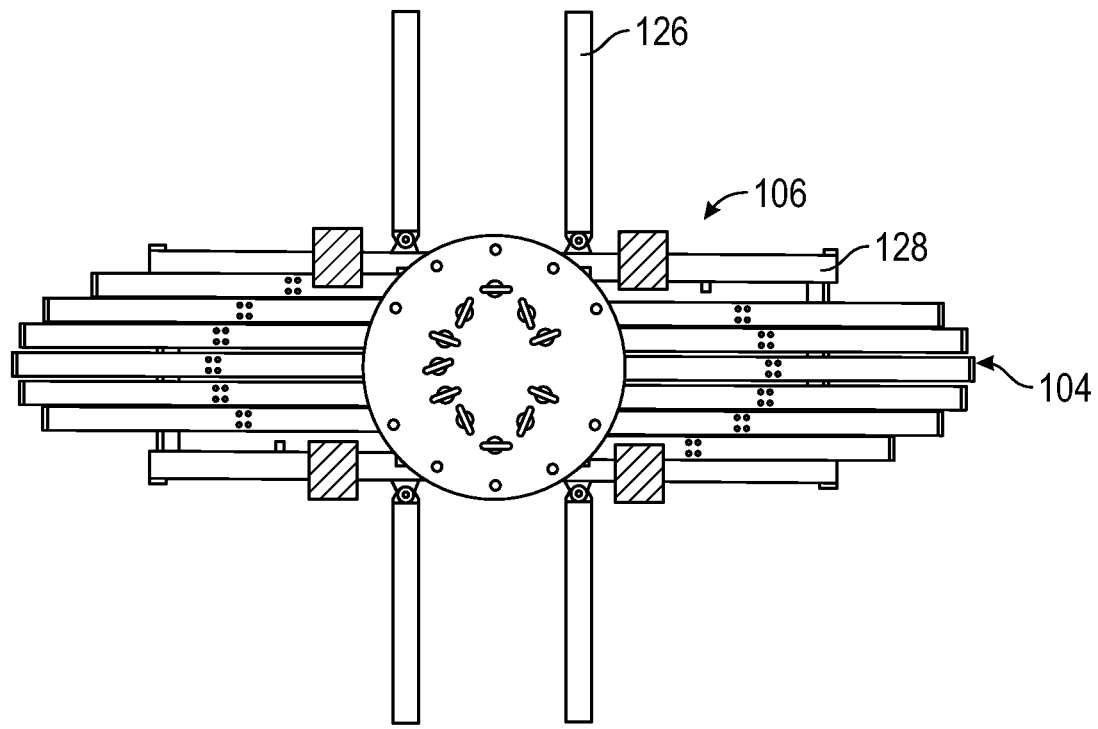
FIG. 7 is a top view of a carousel adapter in a collapsed configuration and a drive unit in an open configuration in accordance with embodiments disclosed herein.
Figure 8:
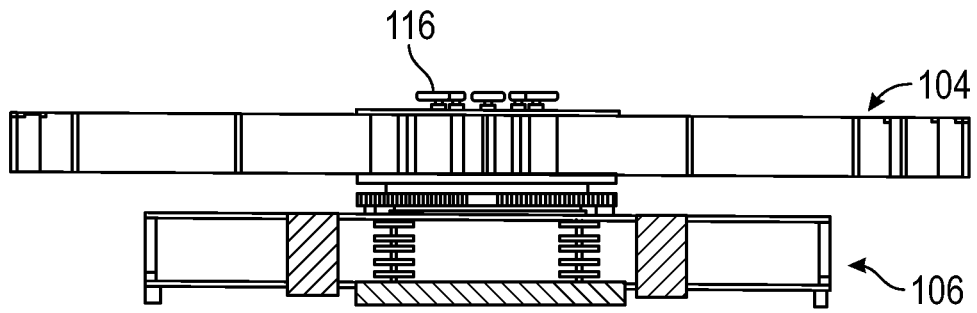
FIG. 8 is a side view of FIG. 6.
Figure 9:
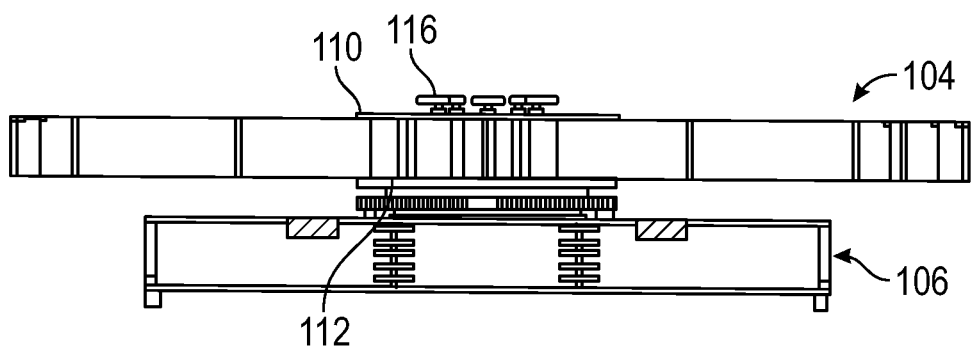
FIG. 9 is a side view of FIG. 7.
Figure 10:
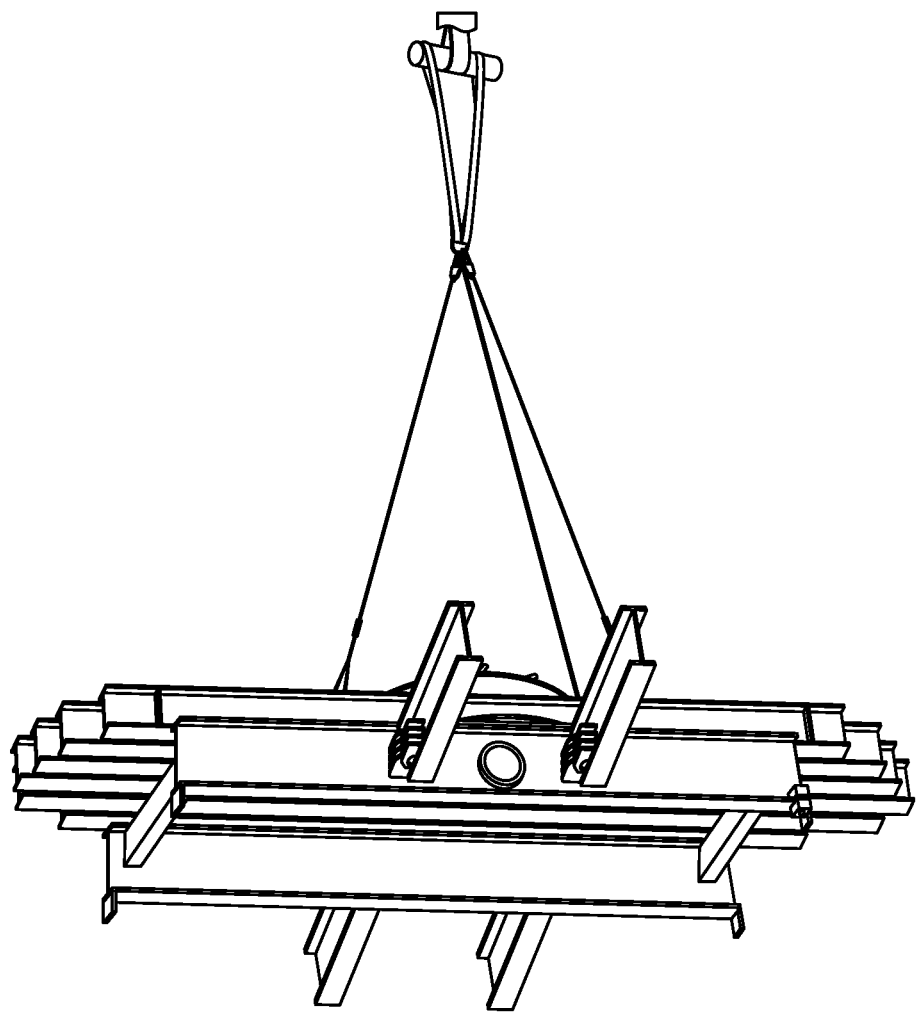
FIG. 10 is a perspective view of a carousel adapter in a collapsed configuration and the drive unit in an open configuration being lifted in accordance with embodiments disclosed herein.

FIG. 6 shows a top view and FIG. 8 shows a side view of the carousel adapter 104 and drive unit 106 in the collapsed configuration ready for shipping. Soft straps may be looped around I-beams of the drive unit 106 base frame 128 and the stabilizing arms 126 in various locations on the assembly in this configuration. FIG. 7 shows a top view and FIG. 9 shows a side view of the carousel adapter 104 in the collapsed configuration and the drive unit 106 with the stabilizing arms 126 in the open configuration with respect to the base frame 128. Beam clamps may be secured to the I-beams of the base frame 128 for offshore lifting in this configuration. FIG. 10 shows a perspective view of the carousel adapter 104 in the collapsed configuration and the drive unit 106 with the stabilizing arms 126 in the open configuration, like FIGS. 7 and 9, while being lifted.

Figure 11:
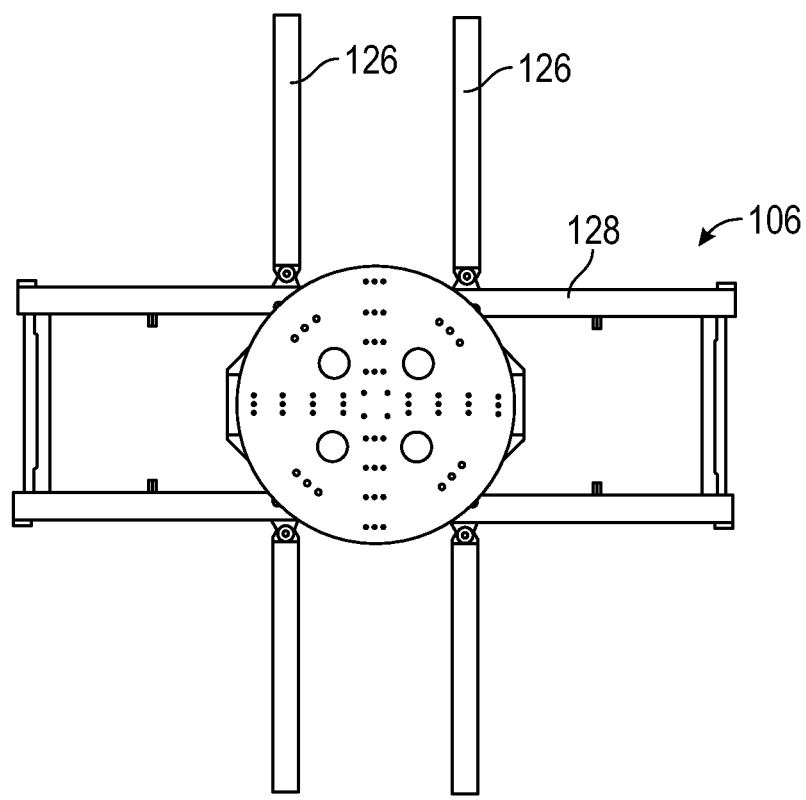
FIG. 11 is a top view of a drive unit in an open configuration in accordance with embodiments disclosed herein.
Figure 12:
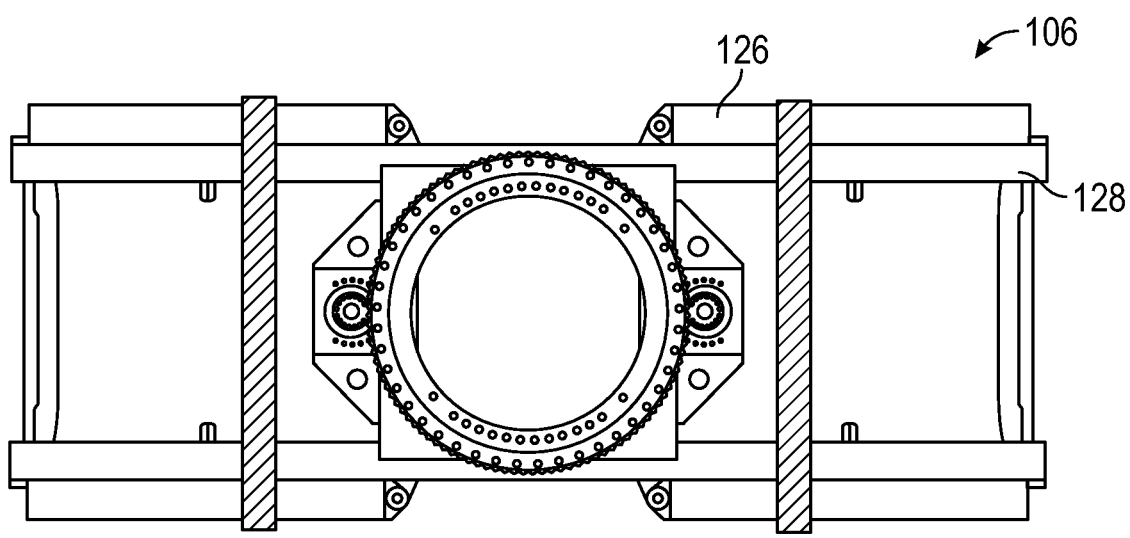
FIG. 12 is a bottom view of a drive unit in a collapsed configuration in accordance with embodiments disclosed herein.

FIG. 11 shows a top view of the drive unit 106 with the stabilizing arms 126 extended or opened. As shown the stabilizing arms 126 are positioned perpendicularly to the base frame 128. The stabilizing arms 126 may be connected to the base frame 128 with a hinge connection joint allowing the stabilizing arms 126 to rotate out from the base frame 128 to a position perpendicular to or any other angle from the base frame 128. FIG. 12 shows a bottom view of the drive unit 106 with the stabilizing arms 126 folded or collapsed against the base frame 128. As shown in FIG. 12, the stabilizing arms 126 may be rotated about a hinge connection or joint until the stabilizing arms 126 are parallel to and/or adjacent the base frame 128.

Referring back to FIGS. 1 and 3, after the drive unit 106 and carousel adapter 104 are lowered onto an offshore vessel, the stabilizing arms 126 may be rotated about hinges 130 into an open or operational configuration and foldable base legs 114 are rotated about swivel pins 116 and locked into position using, for example, locking pins 118. Subsequently, a drum 102 is installed on and coupled to the carousel adapter 104. One of ordinary skill in the art will appreciate that hinges and or swivel pins may be used for either or both of the stabilizing arms 126 and foldable base legs 114.

In one embodiment, the drum 102 may be modular, such that the drum may be installed in sections that are stacked on top of the carousel adapter 104. In this embodiment, drum 102 may include removable and insertable drum sections (not shown). In one embodiment, at the offshore location, each section is installed on and coupled to the carousel adapter 104 and coupled to each subsequent drum segment. In other embodiments, the modular drum may include multiple sections are that coupled together at the offshore location and then the assembled drum 102 is coupled to the carousel adapter 104. This modular construction of the drum, in additional to the foldable or collapsible carousel adapter 104 and drive unit 106, provides a complete carousel assembly with drive unit that may be transported (i.e., via truck and highways) without a permit load.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. An apparatus comprising:
   a carousel adapter, the carousel adapter comprising:
      an upper base plate opposite a lower base plate;
      a fixed base leg coupled between the upper base plate and the lower base plate and extending radially outwardly therefrom; and
      a plurality of foldable base legs coupled between the upper base plate and the lower base plate and extending radially outwardly from the upper and lower base plates, each of the foldable base legs disposed about a periphery of the upper and lower base plates and rotatable about an independent axis perpendicular to the upper base plate and the lower base plate; and
   a drive unit coupled to the carousel adapter, the drive unit comprising:
      a drive base, the drive base having a base frame housing a motor, a gear, and a drive chain; and
      at least one stabilizing arm coupled to the base frame, the at least one stabilizing arm rotatable with respect to the base frame.

2. The apparatus of claim 1, further comprising a swivel pin coupled between the upper base plate, the lower base plate, and one of the plurality of foldable base legs.

3. The apparatus of claim 1, further comprising a drum coupled to carousel adapter.

4. The apparatus of claim 3, wherein the drum is modular.

5. A method comprising:
   fixedly securing a fixed base leg between an upper base plate and a lower base plate;
   rotatably securing a plurality of foldable base legs between the upper base plate and the lower base plate around the periphery of the upper and lower base plates; and
   coupling the lower base plate to a drive unit comprising rotatably securing a stabilizing arm to a base frame of the drive unit.

6. The method of claim 5, further comprising rotating the foldable base legs about an axis perpendicular to the upper and lower base plates to collapse the foldable base legs toward the fixed base leg or an adjacent foldable base leg.

7. The method of claim 5, further comprising rotating the stabilizing arm about an axis perpendicular to the upper and lower base plates to collapse the stabilizing arm toward the base frame of the drive unit.

* * * * *